US008872845B2

(12) United States Patent  
Abe

(10) Patent No.: US 8,872,845 B2  
(45) Date of Patent: Oct. 28, 2014

(54) INFORMATION DISPLAY APPARATUS AND COMPUTER-READABLE STORAGE MEDIUM

(75) Inventor: Wataru Abe, Tokorozawa (JP)

(73) Assignee: Casio Computer Co., Ltd, Tokyo (JP)

( * ) Notice: Subject to any disclaimer, the term of this patent is extended or adjusted under 35 U.S.C. 154(b) by 376 days.

(21) Appl. No.: 13/188,608

(22) Filed: Jul. 22, 2011

(65) Prior Publication Data

US 2012/0019538 A1 Jan. 26, 2012

(30) Foreign Application Priority Data

Jul. 26, 2010 (JP) ................ P2010-166666

(51) Int. Cl.
*G09G 5/00* (2006.01)
*G06F 17/28* (2006.01)
*G06F 17/27* (2006.01)
*G09B 7/00* (2006.01)
*G06F 17/21* (2006.01)

(52) U.S. Cl.
CPC .............. *G09B 7/00* (2013.01); *G06F 17/2863* (2013.01); *G06F 17/2735* (2013.01); *G06F 17/211* (2013.01)
USPC ........................... 345/619; 345/467; 345/581

(58) Field of Classification Search
None
See application file for complete search history.

(56) References Cited

U.S. PATENT DOCUMENTS

2010/0214314 A1\* 8/2010 Hanatani .................. 345/593

FOREIGN PATENT DOCUMENTS

| JP | 09207470 A | \* | 8/1997 |
|----|------------|---|--------|
| JP | 2002-007420 | | 1/2002 |
| JP | 2004-021746 | | 1/2004 |
| JP | 2004-206658 | | 7/2004 |
| JP | 2004-213299 | | 7/2004 |
| JP | 2006-293186 | | 10/2006 |
| KR | 968795 B1 | \* | 7/2010 |

OTHER PUBLICATIONS

Korean Office Action for Korean Application No. 10-2011-0074132 issued on Jan. 30, 2013.
Japanese Office Action for Japanese Application No. 2010-166666 issued on Feb. 28, 2012.

\* cited by examiner

*Primary Examiner* — Jwalant Amin
(74) *Attorney, Agent, or Firm* — Amin, Turocy & Watson, LLP

(57) ABSTRACT

A information display apparatus includes a content storage module, a controller, a specification module, and a marker information storage module. The controller controls a text to be displayed. The specification module specifies, based on a user's operation, a character string, as a marker display character string in the displayed text. The marker information storage module stores position information of the marker display character string within a storage region of the content storage module, and stores a stored time where the position information is stored as being related to the position information. The controller allows the text in an identifiable manner based on the position information, wherein a mode of the identifiable display is differed in accordance with time elapsed since the stored time for the marker display character string.

6 Claims, 11 Drawing Sheets

FIG. 1
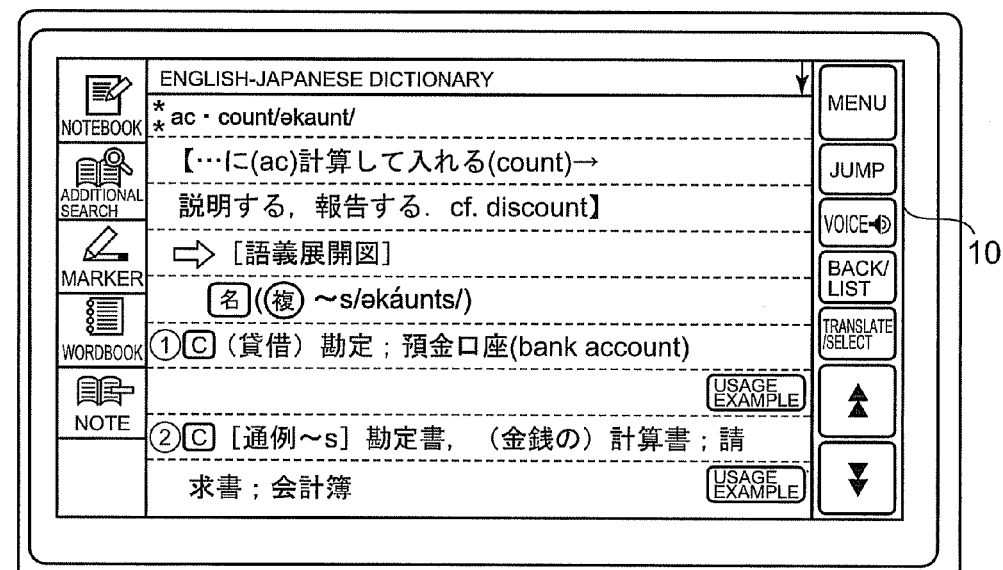
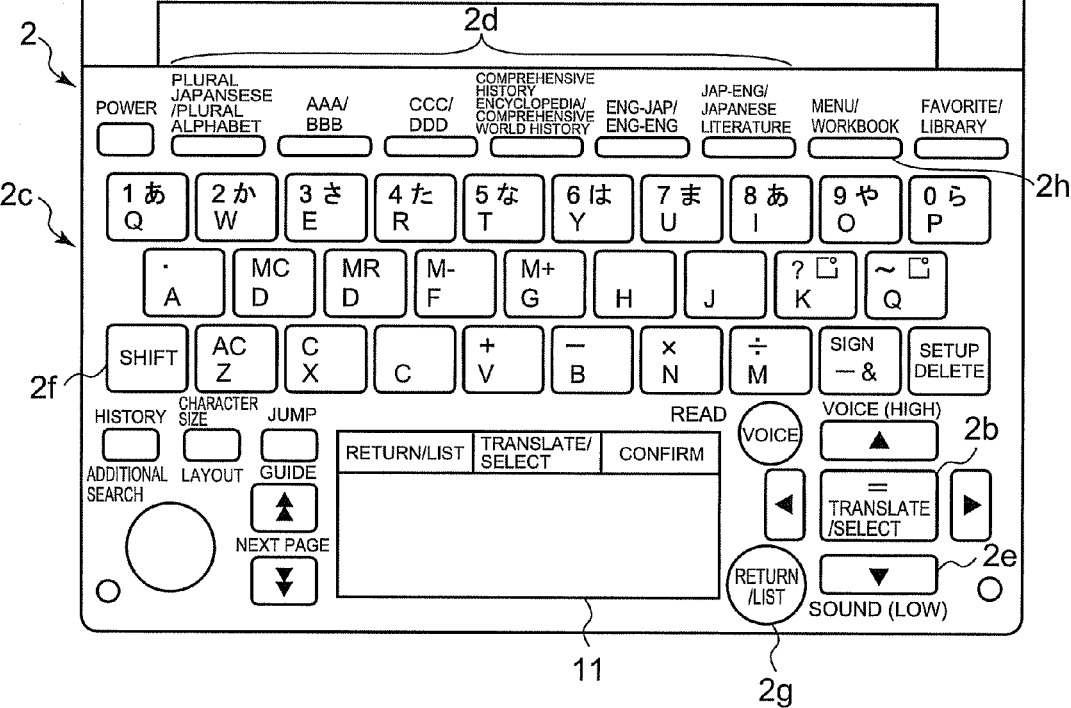

FIG. 3A

| HEADWORD | EXPLANATORY INFORMATION |
|---|---|
| ⋮ | ⋮ |
| whatever | 1. [INTERROGATIVE] WHAT ON EARTH··· |
| ⋮ | ⋮ |

| SET TIME 1 | 30 DAYS |
|---|---|
| SET TIME 2 | 180 DAYS |

| MARKER INFORMATION | | | | | |
|---|---|---|---|---|---|
| ITEM INFORMATION | | | MARKER COLOR | MARKER POSITION | DATE AND TIME |
| CONTENT NAME | ITEM TYPE | ITEM NAME | | | |
| JAPANESE HISTORY SMALL ENCYCLOPEDIA | HEADWORD | YAMASHIRO NO KUNIIKKI | RED | 1~18 | 2009/6/11/12:06:31 |
| JUNIOR HIGH SCHOOL SOCIAL STUDIES GLOSSARY | HEADWORD | BUDDHISM | YELLOW | 51~56 | 2009/7/10/10:05:11 |
| JUNIOR HIGH SCHOOL SOCIAL STUDIES GLOSSARY | HEADWORD | BUDDHISM | YELLOW | 84~90 | 2009/7/10/10:05:25 |
| JUNIOR HIGH SCHOOL SOCIAL STUDIES GLOSSARY | HEADWORD | BUDDHISM | YELLOW | 117~123 | 2009/7/10/10:05:41 |
| JUNIOR HIGH SCHOOL SOCIAL STUDIES GLOSSARY | HEADWORD | BUDDHISM | YELLOW | 110~115 | 2009/7/10/10:05:56 |
| L ENGLISH-ENGLISH DICTIONARY | HEADWORD | trust | BLUE | 18~23 | ... |
| L ENGLISH-ENGLISH DICTIONARY | EXEMPLARY SENTENCE | because | RED | 1~6 | ... |
| JAPANESE HISTORY SMALL ENCYCLOPEDIA | HEADWORD | YAMASHIRO NO KUNIIKKI | YELLOW | 19~29 | ... |
| JUNIOR HIGH SCHOOL SOCIAL STUDIES GLOSSARY | HEADWORD | BUDDHISM | RED | 4~7 | 2009/11/21/19:40:57 |
| ... | ... | ... | ... | ... | ... |
| JUNIOR HIGH SCHOOL SOCIAL STUDIES GLOSSARY | HEADWORD | BUDDHISM | BLUE | 30~32 | 2010/01/01/14:21:30 |
| ... | ... | ... | ... | ... | ... |

FIG. 10A
FIG. 10B
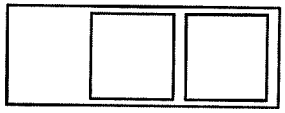
FIG. 10C

INFORMATION DISPLAY APPARATUS AND COMPUTER-READABLE STORAGE MEDIUM

CROSS REFERENCE TO RELATED APPLICATION(S)

The present disclosure relates to the subject matters contained in Japanese Patent Application No. 2010-166666 filed on Jul. 26, 2010, which are incorporated herein by reference in its entirety.

FIELD

The present invention relates to an information display apparatus and a computer-readable storage medium.

BACKGROUND

An information display apparatus in which a text content and a dictionary database are incorporated is equipped with a marker function in order to improve learning effects. As used herein, the term "marker function" refers to a function for storing, when an operation for registering a character string in a text as a marker display character string is received from a user, position information of the character string, and for displaying the character string with a marker to accentuate the character string when the same text is displayed later (see JP-A-2002-7420 and JP-A-2004-213299, for instance).

Further, for an information display apparatus equipped with such a marker function, a technique for displaying a marker display character string in a hidden manner has recently been proposed (see JP-A-2006-293186, for instance). With this technique, a character string portion displayed in a hidden manner can be used for rote learning, thus enabling further improvement in learning effects.

Actually, when a large number of marker display character strings exist in a text, display thereof is complicated, and it is difficult to know the importance of each marker display character string. This may reduce learning effects. Therefore, when a plurality of marker display character strings exist in a text, registration as the marker display character string is preferably cancelled for the character string whose importance reduced.

However, in the technique, when a plurality of marker display character strings exist in a text, a user is forced to determine which marker display character string should be subjected to registration cancellation by himself or herself, thus requiring much time and effort.

SUMMARY OF THE INVENTION

It is one of objects of the present invention to provide an information display apparatus and a computer-readable storage medium which enable easy canceling of registration of a marker display character string.

According to a first aspect of the invention, there is provided an information display apparatus including: a display device; a content storage module that stores a content including one or more pieces of item information, each piece of item information including an item and a text associated with the item; a text display controller that controls, based on a user's operation, the display device to display a certain text associated with a certain item in the content stored in the content storage module; a character string specification module that specifies, based on a user's operation, a character string, as a marker display character string, included in the certain text displayed on the display device; a marker information storage module that stores position information of the marker display character string within a storage region of the content storage module, and stores a stored time where the position information is stored as being related to the position information; and a marker display controller that controls the display device to display the certain text including the marker display character string in an identifiable manner based on the position information of the marker display character string stored in the marker information storage module, wherein, by the marker display controller, a mode of the identifiable display of the marker display character string is differed in accordance with time elapsed since the stored time for the marker display character string.

According to a second aspect of the invention, in the information display apparatus according to the first aspect, the marker display controller may include a hidden-display controller that controls the display device to display the marker display character string as a latent image, when the time elapsed since the stored time for the marker display character string is equal to or greater than a given period of time.

According to a third aspect of the invention, the information display apparatus according to the second aspect may include: a hidden character string specification module that specifies, as a specified marker display character string, one of a plurality of marker display character strings each displayed as a latent image by the hidden-display controller based on a user's operation; a character string input module that receives an input operation for a character string from the user when the specified marker display character string is specified by the hidden character string specification module; a determination module that determines whether or not the specified marker display character string and the inputted character string inputted via the character string input module are substantially identical; a marker information automatic erasure module that erases, from the marker information storage module, information concerning the specified marker display character string when it is determined by the determination module that the specified marker display character string and the inputted character string are substantially identical; and a stored time resetting module that updates, with the time at the present moment, a stored time for the specified marker display character string in the marker information storage module when it is determined by the determination module that the specified marker display character string and the inputted character string are not substantially identical.

According to a fourth aspect of the invention, in the information display apparatus according to any one of the first to the third aspect, the marker display controller may control the display device to display the marker display character string in an identifiable manner of a different mode in accordance with comparison results between the time elapsed since the stored time for the marker display character string and a plurality of given periods of time set in advance.

According to a fifth aspect of the invention, there is provided a computer-readable storage medium that stores an information display program for causing a computer including a display device and a storage module to execute procedures including: storing, in the storage module, a content including one or more pieces of item information, each piece of item information including an item and a text associated with the item; controlling, based on a user's operation, the display device to display a certain text associated with a certain item in the content stored in the storage module; specifying, based on a user's operation, a character string, as a marker display character string, included in the certain text displayed on the display device; storing position information of the marker display character string within a storage region of the storage module, and storing a stored time where the position information is stored as being related to the position information; and controlling the display device to display the certain text including the marker display character string in an identifiable manner based on the position information of the marker display character string stored in the storage module, wherein a mode of the identifiable display of the marker display character string is differed in accordance with time elapsed since the stored time for the marker display character string.

According to the present invention, when a character string in a displayed text is specified as a marker display character string based on a user's operation, position information of the marker display character string is stored, and a stored time of the position information is stored so as to be associated with the position information. In addition, when the text including the marker display character string is displayed, the marker display character string is displayed with a marker based on the position information of the stored marker display character string, and a mode of marker display for each marker display character string is changed in accordance with the time elapsed since the stored time for the marker display character string, thus making it possible to easily determine the marker display character string that has been registered for a long period of time. Accordingly, even when a plurality of marker display character strings exist in a text, it is possible to easily determine which marker display character string should be subjected to registration cancellation, and therefore, it is possible to easily cancel the registration of the marker display character string.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 1 is a plan view schematically illustrating an electronic dictionary.

FIG. 3A is a diagram illustrating a data structure of a dictionary database.

FIG. 3B is a diagram illustrating a data structure of a set time table.

FIG. 4 is a diagram illustrating a data structure of a marker information database.

FIGS. 10A to 10C are diagrams illustrating information displayed on the display device.

DETAILED DESCRIPTION OF THE EMBODIMENTS

Figure 2:
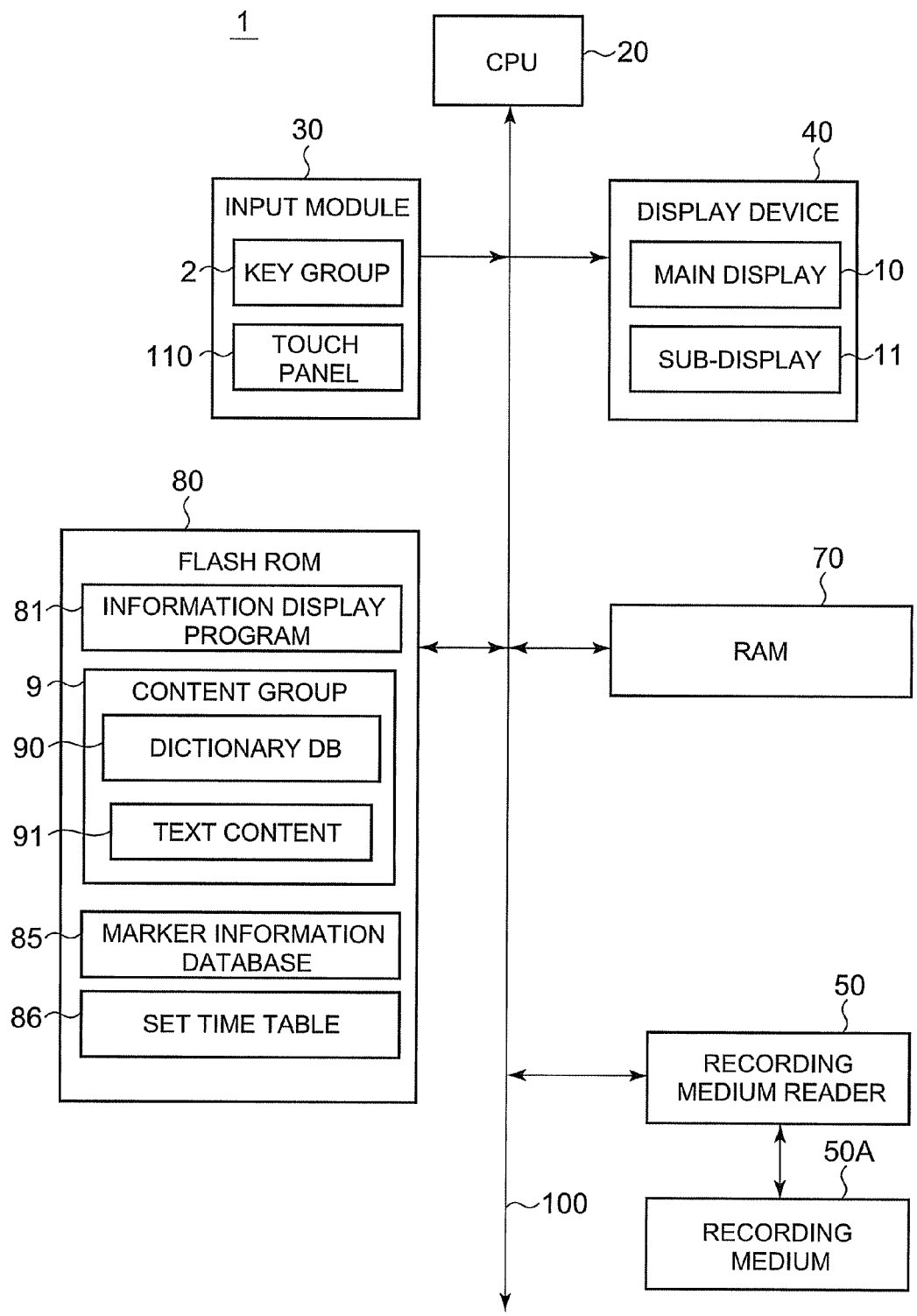
FIG. 2 is a block diagram illustrating an internal configuration of the electronic dictionary.

Hereinafter, an embodiment of the present invention in which an information display apparatus according to the present invention is applied to an electronic dictionary will be described in detail with reference to the drawings.

-External Configuration-

FIG. 1 is a plan view of an electronic dictionary 1.

As illustrated in FIG. 1, the electronic dictionary 1 includes a main display 10, a sub-display 11, and a key group 2.

The main display 10 and the sub-display 11 displays various pieces of data such as characters and codes in response to an operation performed on the key group 2 by a user, and are each formed by a Liquid Crystal Display (LCD), an Electroluminescent Display (ELD) or the like. Note that the main display 10 and the sub-display 11 according to the present embodiment are formed integrally with a so-called touch panel 110 (see FIG. 2), thus making it possible to receive an operation such as a handwriting input.

The key group 2 includes various keys for receiving, from the user, operations for operating the electronic dictionary 1. Specifically, the key group 2 includes a translate/select key 2b, character keys 2c, dictionary selection keys 2d, cursor keys 2e, a shift key 2f, a back key 2g, and a menu key 2h.

The translate/select key 2b is a key used, for example, to conduct a search and decide a headword. The character keys 2c are keys used, for example, for input of characters by the user, and include "A" to "Z" keys in the present embodiment. The dictionary selection keys 2d are keys used to select dictionary databases 90 . . . (see FIG. 2) which will be described later.

The cursor keys 2e are keys used, for example, to move a highlight position within a screen, i.e., a cursor position, and allow specification of upward, downward, rightward and leftward directions in the present embodiment. The shift key 2f is a key used, for example, to set a Japanese word as a search object. The back key 2g is a key used, for example, to back the current screen to the previously displayed screen. The menu key 2h is a key for making various mode settings.

-Internal Configuration-

Next, an internal configuration of the electronic dictionary 1 will be described. FIG. 2 is a block diagram illustrating the internal configuration of the electronic dictionary 1.

As illustrated in FIG. 2, the electronic dictionary 1 includes: a display device 40; an input module 30; a recording medium reader 50; a Central Processing Unit (CPU) 20; a flash Read Only Memory (ROM) 80; and a Random Access Memory (RAM) 70. The respective modules of the electronic dictionary 1 are connected to each other so that mutual data communication is enabled via a bus 100.

The display device 40 includes the foregoing main display 10 and sub-display 11 so that various pieces of information are displayed on the main display 10 and the sub-display 11 based on display signals received from the CPU 20.

The input module 30 includes the foregoing key group 2 and touch panel 110 so that a signal corresponding to the pressed key or position of the touch panel 110 is outputted to the CPU 20.

The recording medium reader 50 reads information from a recording medium 50A such as an SD card, USB memory or CD removably inserted.

The CPU 20 carries out processing based on a given program in response to an inputted instruction, and performs, for example, transfer of an instruction or data to each functional module so as to carry out overall control of the electronic dictionary 1. Specifically, in response to an operation signal or the like received from the input module 30, the CPU 20 reads various programs stored in the flash ROM 80, and carries out processing in accordance with the read programs.

Then, the CPU 20 stores a processing result in the RAM 70, and controls the display device 40 to output the processing result as appropriate.

The flash ROM 80 is a memory that stores programs and data for implementing various functions of the electronic dictionary 1. In the present embodiment, the programs and data stored in the flash ROM 80 include: an information display program 81, according to the present invention; a content group 9; a marker information database 85; and a set time table 86.

The information display program 81 is a program for allowing the CPU 20 to carry out information display processing (see FIGS. 5 to 8) which will be described later.

The content group 9 has a plurality of contents including one or more pieces of item information in which a text is associated with each item. In the present embodiment, the content group 9 has a plurality of dictionary databases 90 and a plurality of text contents 91.

As illustrated in one example in FIG. 3A, for example, the dictionary databases 90, . . . each stores one or more pieces of headword information in which a headword serving as an item is associated with a text of explanatory information for the headword. Note that as the foregoing dictionary databases 90, the dictionary databases 90 such as "JUNIOR HIGH SCHOOL SOCIAL STUDIES GLOSSARY", "JAPANESE HISTORY SMALL ENCYCLOPEDIA" and "L ENGLISH-ENGLISH DICTIONARY" are included in the content group 9 in the present embodiment.

The text contents 91 store a plurality of pieces of item information in which a plurality of types of items (such as chapter numbers) are each associated with a text.

As illustrated in FIG. 4, the marker information database 85 stores: position information (hereinafter referred to as "marker display character string position information") in the content group 9 for a character string (hereinafter referred to as a "marker display character string") specified as a marker display object in the information display processing (see FIGS. 5 to 8) described later; a time (hereinafter referred to as a "stored time") at which the position information is stored in the marker information database 85; and a marker color for marker display of the marker display character string. The marker display character string position information, the stored time and the marker color are stored in the marker information database 85 so as to be associated with each other. More specifically, in the present embodiment, the marker information database 85 stores, as the marker display character string position information, an item name of a text in which the marker display character string is specified, the type of this item (such as a headword in the dictionary database 90 or a chapter number in the text content 91), a name of the content in which the text is included, and start and end positions of the marker display character string in the text. Further, the marker information database 85 stores year, month, day, hour, minute and second as the stored time in the present embodiment, but may store only year, month and day as the stored time.

For time elapsed since the stored time stored in the marker information database 85, the set time table 86 stores a plurality of types of set times serving as processing threshold values in the information display processing described later. More specifically, as illustrated in FIG. 3B, the set time table 86 stores "30 DAYS" as a set time "1" and stores "180 DAYS" as a set time "2" in the present embodiment. Note that these set times are preferably set based on memory holding times for short term memory, intermediate term memory and long term memory.

The RAM 70 includes a memory area for temporarily holding various programs executed by the CPU 20, data concerning the execution of the programs, etc.

-Operations-

Next, operations of the electronic dictionary 1 will be described with reference to FIGS. 5 to 8.

<Information Display Processing>

FIGS. 5 to 8 are flow charts illustrating a flow of information display processing executed by reading the information display program 81 by the CPU 20.

Figure 5:
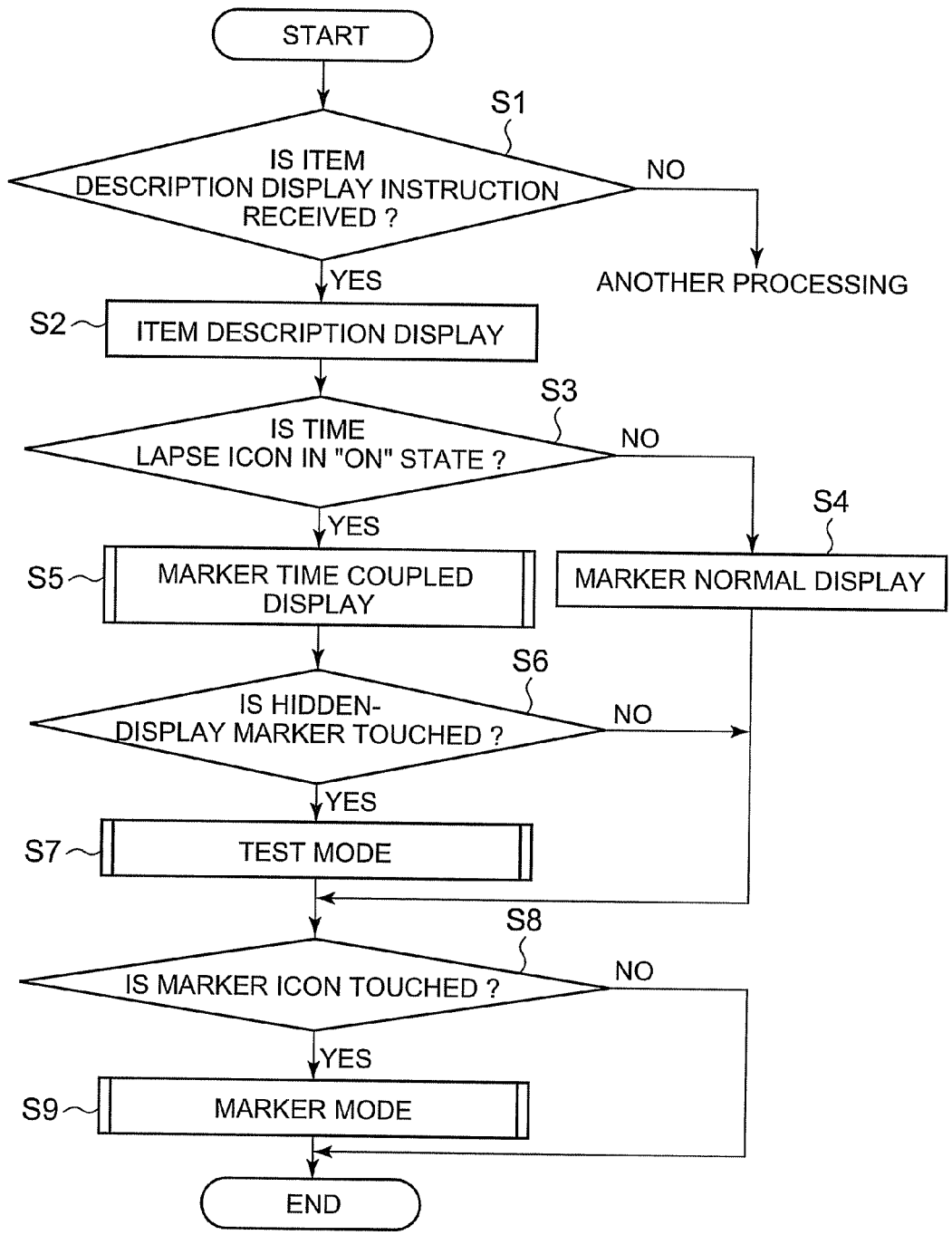
FIG. 5 is a flow chart illustrating information display processing.

In the information display processing, as illustrated in FIG. 5, the CPU 20 first determines whether or not a display instruction operation, by which one of items in one of contents in the content group 9 is selected as a display object, is performed by a user via the menu key 2h or the like (Step S1). Upon determination that no display instruction operation is performed (NO in Step S1) transition is made to another processing.

On the other hand, when it is determined in Step S1 that the display instruction operation is performed by the user (YES in Step S1), the CPU 20 controls the main display 10 to display a text of the item of the display object (which will hereinafter be referred to as a "display object text") in a full-screen manner (Step S2). Furthermore, in this step, the CPU 20 controls the main display 10 to display a marker icon 101 and a time lapse icon 102 (see FIG. 9A) on an end portion of the main display 10.

In this case, the marker icon 101 receives an operation for starting a marker mode processing (Step S9) described later.

Moreover, the time lapse icon 102 receives a switching operation to determine whether or not processing should be performed in consideration of the time elapsed since the stored time stored in the marker information database 85. In addition, the time lapse icon 102 is changed to an ON state when processing is performed in consideration of the elapsed time, and is changed to an OFF state when processing is performed without consideration of the elapsed time.

Subsequently, the CPU 20 determines whether or not the time lapse icon 102 is in the ON state (Step S3). Upon determination that the time lapse icon 102 is not in the ON state (NO in Step S3), the CPU 20 detects, from the marker information database 85, position information of a marker display character string included in the display object text, and allows the marker display character string indicated by the detected position information to be displayed with a marker in the text using a marker color associated with the position information (Step S4). Then, the processing goes to Step S8 described later.

On the other hand, when it is determined in Step S3 that the time lapse icon 102 is in the ON state (YES in Step S3), the CPU 20 performs a marker time coupled display processing (Step S5).

Figure 6:
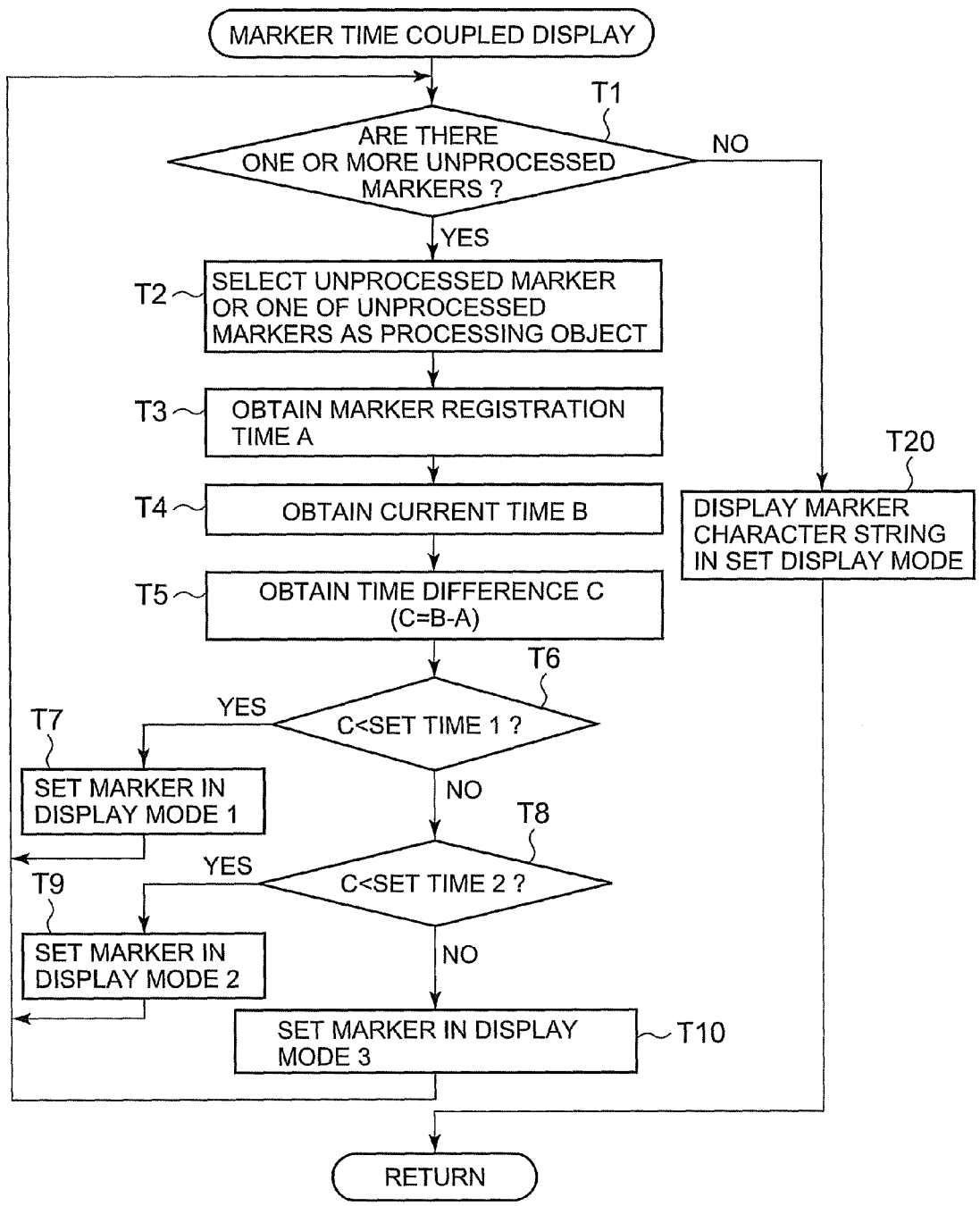
FIG. 6 is a flow chart illustrating a marker time coupled display processing.

Specifically, as illustrated in FIG. 6, in the marker time coupled display processing, the CPU 20 first detects, from the marker information database 85, position information of marker display character strings included in the display object text, and determines whether or not a marker display character string, for which no processing has been performed yet in Steps T2 to T10 described later, exists in a marker display character string group associated with the detected position information (Step T1).

When it is determined in Step T1 that one or more unprocessed marker display character strings exist (YES in Step T1), the CPU 20 selects, as a processing object, the unprocessed marker display character string or one of the unprocessed marker display character strings (Step T2).

Then, the CPU 20 obtains, from the marker information database 85, an information registration time "A" (year, month, day, hour, minute and second) for the marker display character string serving as a processing object (Step T3), obtains a current time "B" (Step T4), and calculates a difference "C" (=B−A) between the times "A" and "B" (Step T5).

Subsequently, the CPU 20 makes a comparison between the set time "1" (30 days in this embodiment) set in advance in the set time table 86 and the difference "C", thereby determining whether or not the difference "C" is smaller than the set time "1" (Step T6).

When it is determined in Step T6 that the difference "C" is smaller than the set time "1" (YES in Step T6), the CPU 20 sets the marker display character string, which is to be selected, to a display mode "1" (Step T7), and then the processing goes to Step T1 described above. In this case, as the display mode "1", a mode in which a marker color has a given reference density is used.

On the other hand, when it is determined in Step T6 that the difference "C" is equal to or greater than the set time "1" (NO in Step T6), the CPU 20 makes a comparison between the set time "2" (180 days in this embodiment) set in advance in the set time table 86 and the difference "C", thereby determining whether or not the difference "C" is smaller than the set time "2" (Step T8).

When it is determined in Step T8 that the difference "C" is smaller than the set time "2" (YES in Step T8), the CPU 20 sets the marker display character string, which is to be selected, to a display mode "2" (Step T9), and then the processing goes to Step T1 described above. In this case, as the display mode "2", a mode in which a marker color has a density lower than the reference density is used.

On the other hand, when it is determined in Step T8 that the difference "C" is equal to or greater than the set time "2" (NO in Step T8), the CPU 20 sets the marker display character string, which is to be selected, to a display mode "3" (Step T10), and then the processing goes to Step T1 described above. In this case, as the display mode "3", a mode in which a marker color density is increased so that the marker display character string becomes a latent image (so that visual recognition thereof is difficult) is used.

Then, when it is determined in Step T1 that no unprocessed marker display character string exists (NO in Step T1), the CPU 20 allows each marker display character string in the display object text to be displayed with a marker in the mode set in Step T7, T9 or T10 described above (Step T20), and ends the marker time coupled display processing. With the above-described marker time coupled display processing, each marker display character string will be displayed with a marker in the mode that is changed in accordance with the time elapsed since the stored time of the position information. Note that when not a single marker display character string exists in the text in Step T20, the CPU 20 ends the marker time coupled display processing without performing any processing.

Upon end of the above-described marker time coupled display processing, as illustrated in FIG. 5, the CPU 20 subsequently determines whether or not a touch operation is performed on one of the marker display character strings, which is displayed in a hidden manner as a latent image (Step S6). Upon determination that no touch operation is performed (NO in Step S6), the processing goes to Step S8 described later.

On the other hand, when it is determined in Step S6 that a touch operation is performed on the marker display character string displayed in a hidden manner (YES in Step S6), the CPU 20 performs a test mode processing for the marker display character string specified by the touch operation, which will hereinafter be referred to as a "specified marker display character string" (Step S7).

Figure 7:
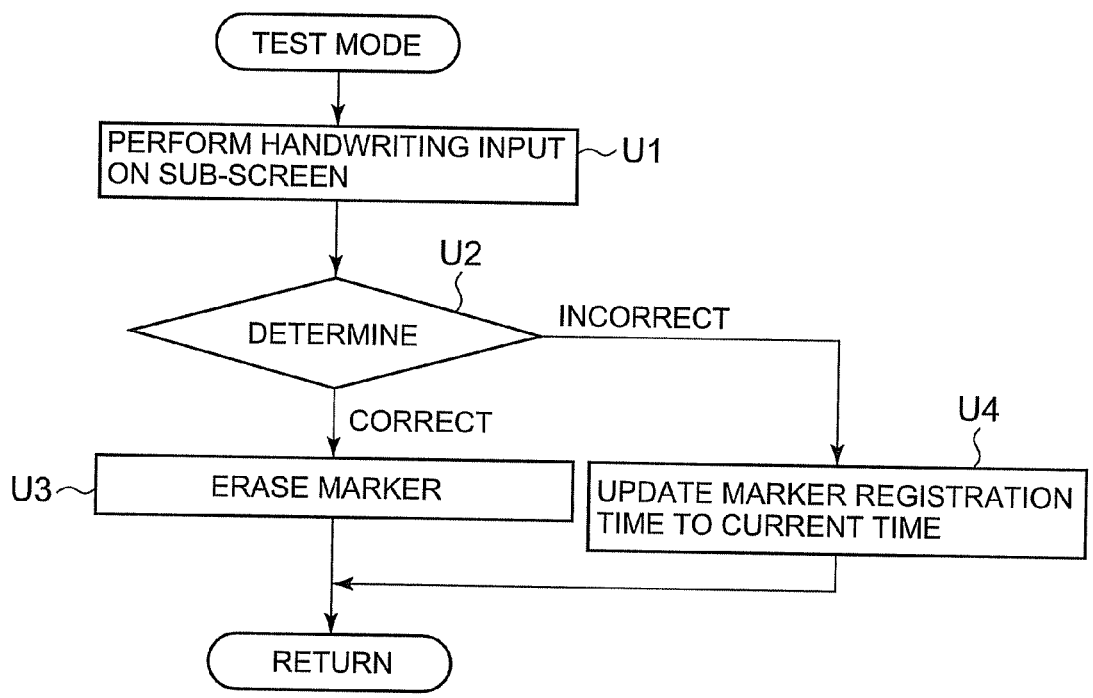
FIG. 7 is a flow chart illustrating a test mode processing.

Specifically, as illustrated in FIG. 7, in the test mode processing, the CPU 20 first receives, via the sub-display 11, a handwriting input for the specified marker display character string (Step U1). However, in Step U1, a character string may be received via the key group 2.

Subsequently, the CPU 20 performs character recognition of a handwritten character string, and then makes a comparison between the handwritten character string and the specified marker display character string, thus determining whether or not both of the character strings are substantially identical, i.e., whether or not the handwritten character string is correct (Step U2).

Then, when it is determined in Step U2 that the handwritten character string is correct (CORRECT in Step U2), the CPU 20 controls the main display 10 to display a message indicative of this fact. Thereafter, the CPU 20 erases registration information of the specified marker display character string from the marker information database 85, and cancels marker display of the specified marker display character string (Step U3), thus ending the test mode processing.

On the other hand, when it is determined in Step U2 that the handwritten character string is incorrect (INCORRECT in Step U2), the CPU 20 allows a message indicative of this fact to be displayed, updates the stored time for the specified marker display character string in the marker information database 85 with the time at the present moment (at the determination moment) (Step U4), and then ends the test mode processing. Note that in Step U4, the CPU 20 calculates the difference "C" (=B−A) from the new information registration time "A" for the specified marker display character string and the current time "B". When the difference "C" is smaller than the set time "1", the CPU 20 allows the specified marker display character string to be displayed with a marker in the display mode "1". When the difference "C" is equal to or greater than the set time "1" and is smaller than the set time "2", the CPU 20 allows the specified marker display character string to be displayed with a marker in the display mode "2". And when the difference "C" is equal to or greater than the set time "2", the CPU 20 allows the specified marker display character string to be displayed with a marker in the display mode "3".

Upon end of the above-described test mode processing, as illustrated in FIG. 5, the CPU 20 subsequently determines whether or not a touch operation is performed on the marker icon 101 on the main display 10 (Step S8). Upon determination that no touch operation is performed on the marker icon 101 (NO in Step S8), the CPU 20 ends the information display processing.

On the other hand, when it is determined in Step S8 that a touch operation is performed on the marker icon 101 (YES in Step S8), the CPU 20 performs a marker mode processing (Step S9).

Figure 8:
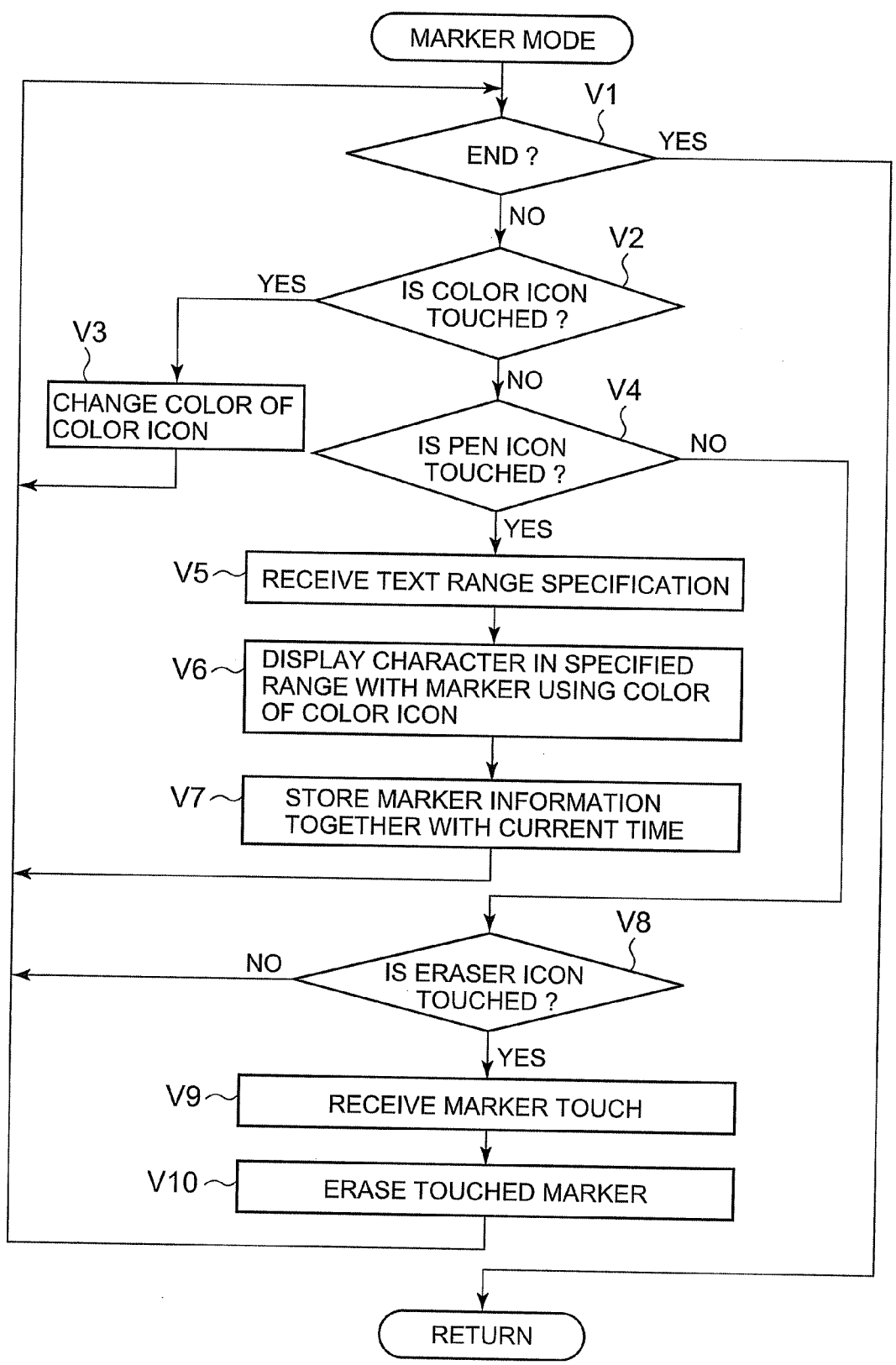
FIG. 8 is a flow chart illustrating a marker mode processing.

Specifically, as illustrated in FIG. 8, in the marker mode processing, the CPU 20 first controls the main display 10 to display a pen icon 104, a color selection icon 105 and an eraser icon 106 (see FIG. 9B) on the end portion of the main display 10, and determines whether or not an operation for ending the marker mode processing is performed (Step V1).

In this case, the pen icon 104 receives an operation for starting specification of the marker display character string.

Further, the color selection icon 105 receives an operation for changing the marker color of the marker display character string, and is displayed with the same color as the marker color in the present embodiment.

Furthermore, the eraser icon 106 receives an operation for canceling specification of the marker display character string.

When it is determined in Step V1 that the ending operation is not performed (NO in Step V1), the CPU 20 determines whether or not a touch operation is performed on the color selection icon 105 (Step V2).

When it is determined in Step V2 that a touch operation is performed on the color selection icon 105 (YES in Step V2), the CPU 20 changes the display color of the color selection icon 105, i.e., the marker color of the marker display character string (Step V3), and then the processing goes to Step V1 described above. Note that in the present embodiment, the CPU 20 changes the display color of the color selection icon 105 to red, yellow, blue and red sequentially in a switching manner.

On the other hand, when it is determined in Step V2 that no touch operation is performed on the color selection icon 105 (NO in Step V2), the CPU 20 determines whether or not a touch operation is performed on the pen icon 104 (Step V4).

When it is determined in Step V4 that a touch operation is performed on the pen icon 104 (YES in Step V4), the CPU 20 receives a range specification operation for a character string in the display object text (Step V5), and displays, as the marker display character string, the character string, for which the range specification has been performed, with a marker using the display color of the color selection icon 105 (Step V6).

Subsequently, the CPU 20 allows the position information of the marker display character string, the marker color thereof, and the time at the present moment to be accumulated and stored in the marker information database 85 so as to be associated with each other (Step V7), and the processing goes to Step V1 described above.

On the other hand, when it is determined in Step V4 that no touch operation is performed on the pen icon 104 (NO in Step V4), the CPU 20 determines whether or not a touch operation is performed on the eraser icon 106 (Step V8). Upon determination that no touch operation is performed on the eraser icon 106 (NO in Step V8), the processing goes to Step V1 described above.

On the other hand, when it is determined in Step V8 that a touch operation is performed on the eraser icon 106 (YES in Step V8), the CPU 20 receives the touch operation performed for the marker display character string (Step V9).

Subsequently, for the marker display character string for which the touch operation has been performed, the CPU erases registration information from the marker information database 85 and cancels marker display (Step V10), and then the processing goes to Step V1 described above.

Then, when it is determined in Step V1 that the ending operation is performed (YES in Step V1), the CPU 20 ends is the marker mode processing. Furthermore, in this case, the CPU 20 controls the main display 10 to display the marker icon 101 and the time lapse icon 102 on the end portion of the main display 10.

Then, upon end of the above-described marker mode processing, the CPU 20 ends the information display processing as illustrated in FIG. 5.

-Operation Example-

Next, referring to FIGS. 9A to 11C, the foregoing information display processing will be specifically described.

Note that in the following operation example, range specification is performed on character strings such as "大乗仏教 (daijo bukkyo)", "上座部(じょうざぶ)仏教 (jozabu bukkyo)", "カースト制度 (kasuto seido)" and "ヘレニズム文化 (herenizumu bunka)" as the marker display character strings in advance in the text of the "JUNIOR HIGH SCHOOL SOCIAL STUDIES GLOSSARY" (Step V5), and the position information of each marker display character string, the marker color thereof, and the time at the present moment are accumulated and stored in the marker information database 85 so as to be associated with each other (Step V7).

Figure 9A:
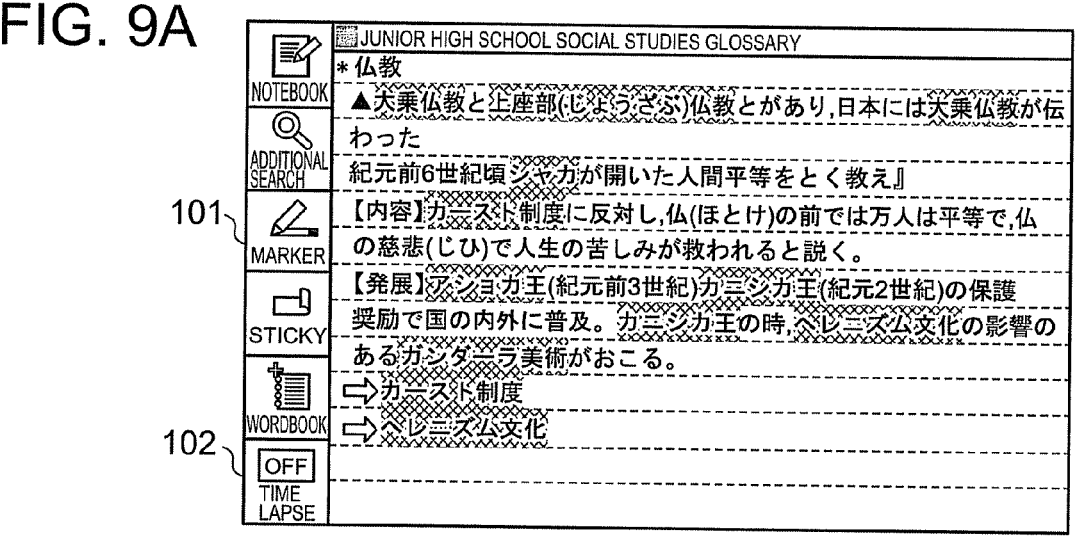
FIGS. 9A to 9C are diagrams illustrating information displayed on a display device.

In this state, first, as illustrated in FIG. 9A, when a user performs a display instruction operation for the text including a headword "仏教 (bukkyo)" in the dictionary database 90 of the "JUNIOR HIGH SCHOOL SOCIAL STUDIES GLOSSARY"(YES in Step S1), this text is displayed in a full-screen manner, and the marker icon 101 and the time lapse icon 102 are displayed on the end portion of the main display 10.

Subsequently, it is determined that the time lapse icon 102 is not in the ON state (NO in Step S3), the position information of the marker display character string included in the text of the "JUNIOR HIGH SCHOOL SOCIAL STUDIES GLOSSARY" is detected from the marker information database 85, and the marker display character string indicated by the detected position information is displayed with a marker in the text using a marker color associated with the position information (Step S4). Note that in FIG. 9A, the character string such as "大乗仏教" is displayed with a red marker, the character string such as "シャカ (shaka)" is displayed with a blue marker, and the character string such as "カースト制度" is displayed with a yellow marker.

Figure 9B:
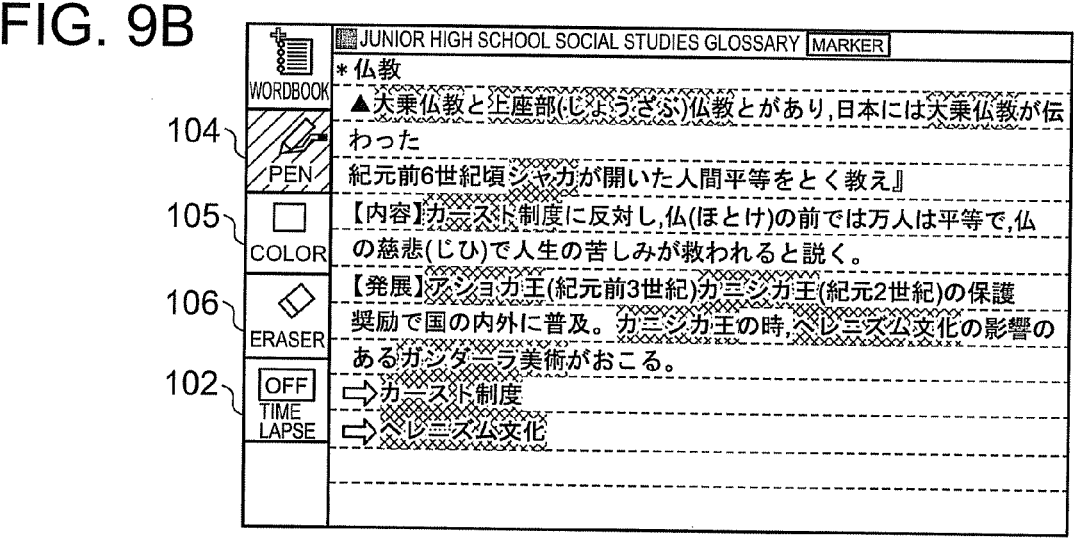

Next, when the user performs a touch operation on the marker icon 101 (YES in Step S8), the pen icon 104, the color selection icon 105 and the eraser icon 106 are displayed on the end portion of the main display 10 as illustrated in FIG. 9B, thereby enabling registration of the marker display character string (Step V1).

Figure 9C:
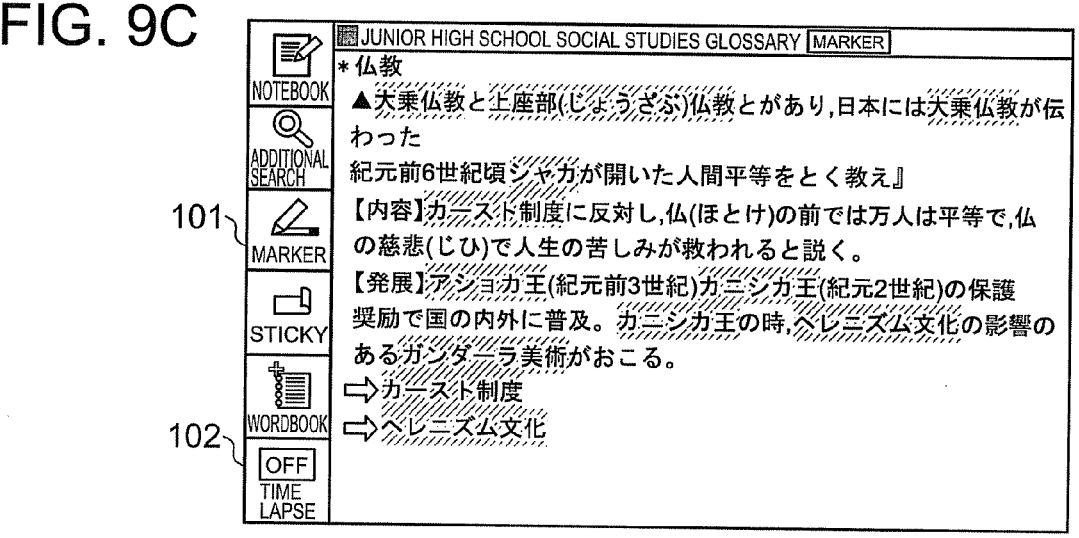

On the other hand, when the time lapse icon 102 is in the ON state in the status illustrated in FIG. 9A (YES in Step S3), each marker display character string is displayed with a marker in the mode (i.e., with a density) which is changed in accordance with the time elapsed since the stored time of the position information as illustrated in FIG. 9C (Step S5). Note that in FIG. 9C, the difference "C" between the information registration time "A" for each marker display character string and the current time "B" is determined to be equal to or greater than the set time "1" (NO in Step T6) and smaller than the set time "2" (YES in Step T8), and each marker display character string is displayed with a marker in the display mode "2", i.e., the mode in which the marker color is lower than the reference density (Step T20).

In this case, when the difference "C" between the information registration time "A" for the marker display character strings, such as the "カースト制度" and "ヘレニズム文化" displayed with yellow markers, and the current time "B" is equal to or greater than the set time "2" (NO in Step T6, and NO in Step T8), each of the marker display character strings is displayed with a marker in the display mode "3" (the mode in which a marker color density is increased so that each of the marker display character strings becomes a latent image) as illustrated in FIG. 10A (Step T20).

Subsequently, as illustrated in FIG. 10B and 10C, the user performs a touch operation on the marker display character string "ヘレニズム文化" displayed in a hidden manner as a latent image (YES in Step S6), and a handwriting input "ヘレニズム文化" is performed on the sub-display 11 for the specified marker display character string "ヘレニズム文化" specified by the touch operation (Step U1); then, the handwritten character string is determined to be correct (CORRECT in Step U2), and a message indicative of this fact is displayed.

Figure 11A:
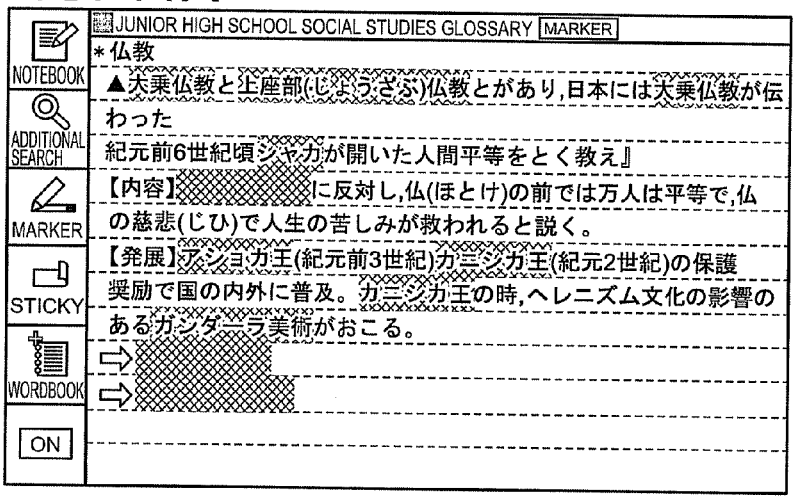
FIGS. 11A to 11C are diagrams illustrating information displayed on the display device.

Then, as illustrated in FIG. 11A, for the specified marker display character string "ヘレニズム文化" registration information is erased from the marker information database 85, and marker display is cancelled (Step U3).

Figure 11B:
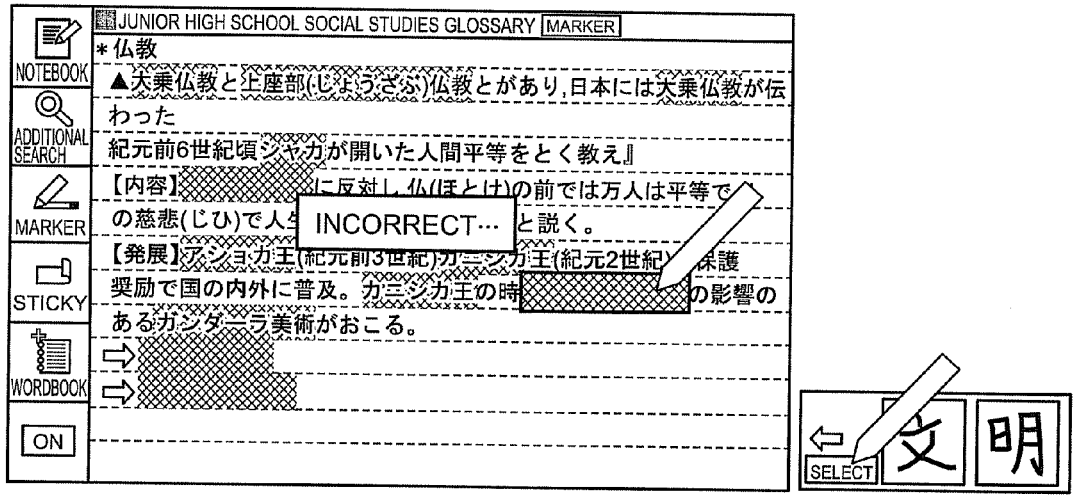

Further, as illustrated in FIG. 11B, the user performs a touch operation on the marker display character string "ヘレニズム文化" displayed in a hidden manner as a latent image (YES in Step S6), and performs a handwriting input "ヘレニズム文明 (herenizumu bunmei)" on the sub-display 11 for the specified marker display character string "ヘレニズム文化" specified by the touch operation (Step U1); then, the handwritten character string is determined to be incorrect (INCORRECT in Step U2), and a message indicative of this fact is displayed.

Figure 11C:
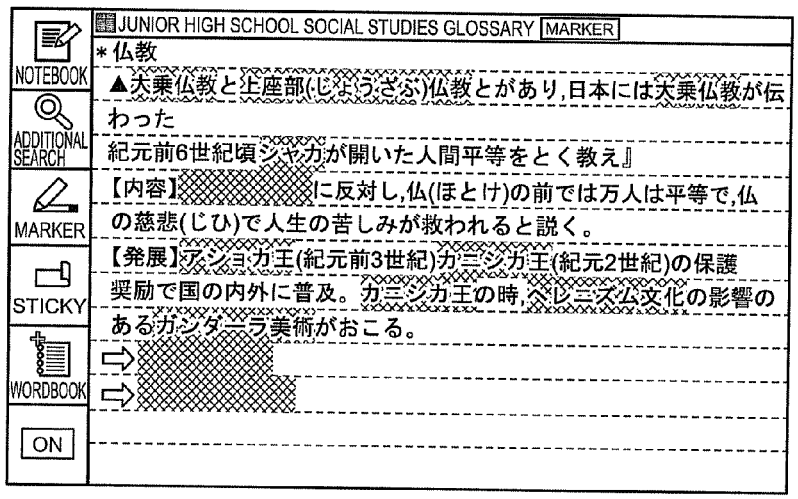

Then, as illustrated in FIG. 11C, the stored time for the specified marker display character string "ヘレニズム文化" in the marker information database 85 is updated with the time at the present moment (at the determination moment) (Step U4), the difference "C" (=B−A) between the new information registration time "A" for the specified marker display character string "ヘレニズム文化" and the current time "B" is calculated, the difference "C" is determined to be smaller than the set time "1", and the specified marker display character string "ヘレニズム文化" is displayed with a marker in the display mode "1".

In the above-described electronic dictionary 1, as illustrated in Step S9 of FIG. 5, Steps T1 to T20 of FIG. 6, FIG. 9C and FIG. 10A, for example, the following operations are performed. When a character string in a displayed text is specified as a marker display character string based on a user's operation, position information of the marker display character string is stored, and a stored time of the position information is stored so as to be associated with the position information. In addition, when the text including the marker display character string is displayed, the marker display character string is displayed with a marker based on the position information of the stored marker display character string, and the mode of marker display for each marker display character string is changed in accordance with the time elapsed since the stored time for the marker display character string, thus making it possible to easily determine the marker display character string that has been registered for a long period of time. Accordingly, even when a plurality of marker display character strings exist in a text, it is possible to easily determine which marker display character string should be subjected to registration cancellation, and therefore, it is possible to easily cancel the registration of the marker display character string.

Further, as illustrated in Step T10 of FIG. 6 and FIG. 10A, for example, when the time elapsed since the stored time for a marker display character string is equal to or greater than a given period of time, the marker display character string is displayed with a marker so as to become a latent image, and therefore, the marker display character string, which has been registered for a long period of time, can be used for rote learning.

Furthermore, as illustrated in Steps S6 and S7 of FIG. 5, FIG. 7, FIGS. 10A to 10C, and FIGS. 11A to 11C, for example, the following operations are performed. When one of marker display character strings, displayed as a latent image, is specified as a specified marker display character string based on a user's operation and an input operation for a character string is received from the user, it is determined whether or not the specified marker display character string and the inputted character string are substantially identical. Upon determination that the specified marker display character string and the inputted character string are substantially identical, information concerning the specified marker display character string is erased from the marker information database 85, and upon determination that the specified marker display character string and the inputted character string are not substantially identical, the stored time for the specified marker display character string is stored as the time at the present moment in the marker information database 85. Accordingly, a rote learning test for a marker display character string, which has been registered for a long period of time, can be carried out, and the registration of the marker display character string can be cancelled when the answer is correct in the rote learning test; on the other hand, the registration time of the marker display character string can be updated to the time at the present moment when the answer is incorrect in the rote learning test. Hence, as for a marker display character string for which the necessity for marker display is reduced, the registration thereof as a marker display character string can be cancelled; on the other hand, as for a marker display character string for which the necessity for marker display is still high, the marker display character string can be registered again as a newly registered marker display character string.

Note that an embodiment to which the present invention is applicable is not limited to the foregoing embodiment, but appropriate changes may be made thereto without departing from the spirit of the present invention.

For example, although the information display apparatus according to the present invention has been described as the electronic dictionary 1, an apparatus to which the present invention is applicable is not limited to such a product but the present invention is applicable to all kinds of electronic apparatuses such as a mobile phone, a personal computer, a Personal Digital Assistant (PDA) and a game machine. Further, the information display program 81 according to the present invention may be stored in the recording medium 50A, insertable into and removable from the electronic dictionary 1, together with the content group 9.

Furthermore, although the description has been made on the assumption that a marker display character string, which is to be selected, is set in the display mode "3" when the difference "C" between the information registration time "A" and the current time "B" is equal to or greater than the set time "2", but in such a case, information concerning the marker display character string may alternatively be erased from the marker information database 85. In that case, for a marker display character string that has been registered for a long period of time, the registration thereof as a marker display character string can be automatically cancelled. In such an embodiment, as the display mode "1" or "2", the mode in which a marker color density is increased so that the marker display character string becomes a latent image may be used.

Moreover, the description has been made on the assumption that the stored time "A" for a marker display character string is stored and the difference "C" between the time "A" and the time "B" at the present moment is compared with the set times "1" and "2", thus changing the display mode for marker display. However, the total number of operations performed in the electronic dictionary 1 at a stored time point may be stored, and a difference between the total number of operations at the stored time point and the total number of operations at the present time point may be compared with a given threshold value, thus changing the display mode.

In addition, the description has been made on the assumption that information concerning a marker display character string including start and end positions, marker color and stored time of the marker display character string, is stored in the marker information database 85. However, such information may be stored in association with a relevant item of each content in the content group 9.

Besides, the description has been made on the assumption that in the test mode processing, the CPU 20 makes a comparison between a character string inputted by a user and a specified marker display character string to determine whether the inputted character string is correct or incorrect. However, the CPU 20 may control the main display 10 to display a specified marker display character string after a character string has been inputted by a user, and may allow the user himself or herself to determine whether the inputted character string is correct or incorrect. In that case, upon input of a determination result by the user via the key group 2, the CPU 20 will perform the processing of Step U3 or U4 based on the determination result.

What is claimed is:

1. An information display apparatus comprising:
   a display device;
   a content storage module that stores a content comprising one or more pieces of item information, each piece of item information comprising an item and a text associated with the item;
   a text display controller that controls, based on a user's operation, the display device to display a certain text associated with a certain item in the content stored in the content storage module;
   a character string specification module that specifies, based on a user's operation, a character string, as a marker display character string, included in the certain text displayed on the display device;
   a marker information storage module that stores position information of the marker display character string within a storage region of the content storage module, and stores a stored time where the position information is stored as being related to the position information;
   a marker display controller that controls the display device to display the marker display character string in a specified marker color which a user specifies based on the position information of the marker display character string stored in the marker information storage module,
   wherein, by the marker display controller, the marker color of the marker display character string is displayed in a light color in accordance with time elapsed since the stored time for the marker display character string; and
   a hidden-display controller that controls the display device to display the marker display character string as a latent image, when the time elapsed since the stored time for the marker display character string is equal to or greater than a given period of time.

2. The information display apparatus according to claim 1, further comprising:
   a hidden character string specification module that specifies, as a specified marker display character string, one of a plurality of marker display character strings each displayed as a latent image by the hidden-display controller based on a user's operation;
   a character string input module that receives an input operation for a character string from the user when the specified marker display character string is specified by the hidden character string specification module;
   a determination module that determines whether or not the specified marker display character string and the inputted character string inputted via the character string input module are substantially identical;
   a marker information automatic erasure module that erases, from the marker information storage module, information concerning the specified marker display character string when it is determined by the determination module that the specified marker display character string and the inputted character string are substantially identical; and
   a stored time resetting module that updates, with the time at the present moment, a stored time for the specified marker display character string in the marker information storage module when it is determined by the determination module that the specified marker display character string and the inputted character string are not substantially identical.

3. The information display apparatus according to claim 1, wherein the marker display controller controls the display device to display the marker display character string by changing a density of the marker color in accordance with comparison results between the time elapsed since the stored time for the marker display character string and a plurality of given periods of time set in advance.

4. A non-transitory computer-readable storage medium that stores an information display program for causing a computer comprising a display device and a storage module to execute procedures comprising:
   storing, in the storage module, a content comprising one or more pieces of item information, each piece of item information comprising an item and a text associated with the item;
   controlling, based on a user's operation, the display device to display a certain text associated with a certain item in the content stored in the storage module;
   specifying, based on a user's operation, a character string, as a marker display character string, included in the certain text displayed on the display device;
   storing position information of the marker display character string within a storage region of the storage module, and storing a stored time where the position information is stored as being related to the position information; and
   controlling the display device to display the marker display character string in a specified marker color which a user specifies based on the position information of the marker display character string stored in the storage module, wherein the marker color of the marker display character string is displayed in a light color in accordance with time elapsed since the stored time for the marker display character string; and
   in the display controlling of the marker display character string, controlling the display device to display the marker display character string as a latent image, when the time elapsed since the stored time for the marker display character string is equal to or greater than a given period of time.

5. The non-transitory storage medium according to claim 4, the procedures further comprising:
   specifying, as a specified marker display character string, one of a plurality of marker display character strings each displayed as a latent image based on a user's operation;
   receiving an input operation for a character string from the user when the specified marker display character string is specified;
   determining whether or not the specified marker display character string and the inputted character string inputted by the input operation are substantially identical;
   erasing, from the storage module, information concerning the specified marker display character string when it is determined that the specified marker display character string and the inputted character string are substantially identical; and updating, with the time at the present moment, a stored time for the specified marker display character string in the storage module when it is determined that the specified marker display character string and the inputted character string are not substantially identical.

6. The non-transitory storage medium according to claim 4, the procedures further comprising, in the display controlling of the marker display character string, controlling the display device to display the marker display character string by changing a density of the marker color in accordance with comparison results between the time elapsed since the stored time for the marker display character string and a plurality of given periods of time set in advance.

* * * * *